(12) United States Patent
Murata

(10) Patent No.: US 8,579,285 B2
(45) Date of Patent: Nov. 12, 2013

(54) DOCUMENT CONVEYING DEVICE AND IMAGE FORMING APPARATUS WITH FIRST AND SECOND DOCUMENT DETECTORS AND PULSE COUNT DETECTOR

(71) Applicant: Kyocera Document Solutions Inc., Osaka (JP)

(72) Inventor: Takurou Murata, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/728,470

(22) Filed: Dec. 27, 2012

(65) Prior Publication Data

US 2013/0168919 A1 Jul. 4, 2013

(30) Foreign Application Priority Data

Dec. 28, 2011 (JP) .................................. 2011-289635

(51) Int. Cl.
*B65H 7/08* (2006.01)

(52) U.S. Cl.
CPC ........................................ *B65H 7/08* (2013.01)
USPC .............................................. 271/261; 271/111

(58) Field of Classification Search
USPC ............................. 271/111, 227, 261, 265.03
See application file for complete search history.

(56) References Cited

U.S. PATENT DOCUMENTS

| 6,988,725 | B2 * | 1/2006 | Rapkin | 271/227 |
| 7,942,408 | B2 * | 5/2011 | Kato et al. | 271/227 |
| 2005/0067771 | A1 * | 3/2005 | Carolan | 271/228 |
| 2011/0089629 | A1 * | 4/2011 | Furusawa et al. | 271/227 |
| 2013/0032993 | A1 * | 2/2013 | Izumiya et al. | 271/227 |

FOREIGN PATENT DOCUMENTS

JP 10-073891 3/1998

* cited by examiner

*Primary Examiner* — Gerald McClain
(74) *Attorney, Agent, or Firm* — K&L Gates LLP

(57) ABSTRACT

A document conveying device includes a document conveying unit, a controller, first and second document detectors, a pulse count detector, and a determining unit. The first document detector is located on a feeding path along which a document is fed by the document conveying unit, and detects a document leading edge. The second document detector is located at a position different from that of the first document detector in both a document feeding direction and a direction orthogonal thereto, and detects the document leading edge. The determining unit determines whether the number of pulses detected by the pulse count detector during the period from detection of the document leading edge by one of the first and second document detectors to detection of the document leading edge by the other exceeds a predetermined value. If the number of pulses exceeds the predetermined value, the controller stops the document feeding operation.

10 Claims, 6 Drawing Sheets

DOCUMENT CONVEYING DEVICE AND IMAGE FORMING APPARATUS WITH FIRST AND SECOND DOCUMENT DETECTORS AND PULSE COUNT DETECTOR

INCORPORATION BY REFERENCE

This application is based upon, and claims the benefit of priority from, corresponding Japanese Patent Application No. 2011-289635, filed in the Japan Patent Office on Dec. 28, 2011, the entire contents of which is incorporated herein by reference.

FIELD

The present disclosure relates to a document conveying device and an image forming apparatus, and particularly to document feeding control performed when a document is skewed during the feeding process.

BACKGROUND

In a document conveying device that feeds a document toward a document reader, such as a scanner, the document may be damaged if fed at an angle with respect to the document conveying direction. A document conveying device is known which has a mechanism for detecting an inclination of a document during conveyance. For example, there is a device wherein in which two sensors for detecting a leading edge of a fed document are arranged side by side on a line orthogonal to the document conveying direction. The device detects an inclination of the document during conveyance based on the difference in the number of pulses between the two sensors. The number of pulses is counted for each sensor during the period from the start of driving a driving motor designed for document conveyance, the driving motor being driven using a pulse signal, to the detection of the leading edge of the document.

In the device described above, the two sensors need to be arranged in a line orthogonal to the document conveying direction without misalignment, accuracy is required in positioning each sensor. The device described above is configured to determine the amount of inclination of a document based on the difference in the number of pulses between the two sensors, the number of pulses being counted for each sensor until detection of the leading edge of the document. This determination is based on the premise that the two sensors are aligned. Therefore, if there is any misalignment in positioning each sensor, the number of pulses may not be accurately counted. This may lead to an error in the detected amount of inclination of the document. As a result, it may not be possible to accurately perform document feeding control that involves either continuing or stopping the document conveyance depending on the amount of inclination of the document.

SUMMARY

A document conveying device according to an embodiment of the present disclosure includes a document conveying unit, a controller, a first document detector, a second document detector, a pulse count detector, and a determining unit. The document conveying unit is configured to feed a document. The controller is configured to control the document conveying operation performed by the document conveying unit. The first document detector is located on a conveying path along which a document is fed by the document conveying unit, and is configured to detect a leading edge of the document. The second document detector is located at a position different from that of the first document detector in both a document feeding direction and a direction orthogonal to the document feeding direction, the document feeding direction being a direction in which the document conveying unit feeds the document, and is configured to detect the leading edge of the document. The pulse count detector is configured to detect the number of pulses of a pulse signal that the controller uses to drive-control the document conveying unit. The determining unit is configured to determine whether the number of pulses detected by the pulse count detector during the period from the detection of a document leading edge by one of the first and second document detectors to the detection of the document leading edge by the other of the first and second document detectors exceeds a predetermined value. If the determining unit determines that the number of pulses exceeds the predetermined value, the controller stops the document feeding operation.

An image forming apparatus according to another embodiment of the present disclosure includes the document conveying device described above, a document reader, and an image forming assembly. The document reader is configured to read an image of a document fed by the document conveying unit. The image forming assembly is configured to perform image formation based on the document image read by the document reader.

Additional features and advantages are described herein, and will be apparent from the following Detailed Description and the figures.

DETAILED DESCRIPTION

Figure 1:
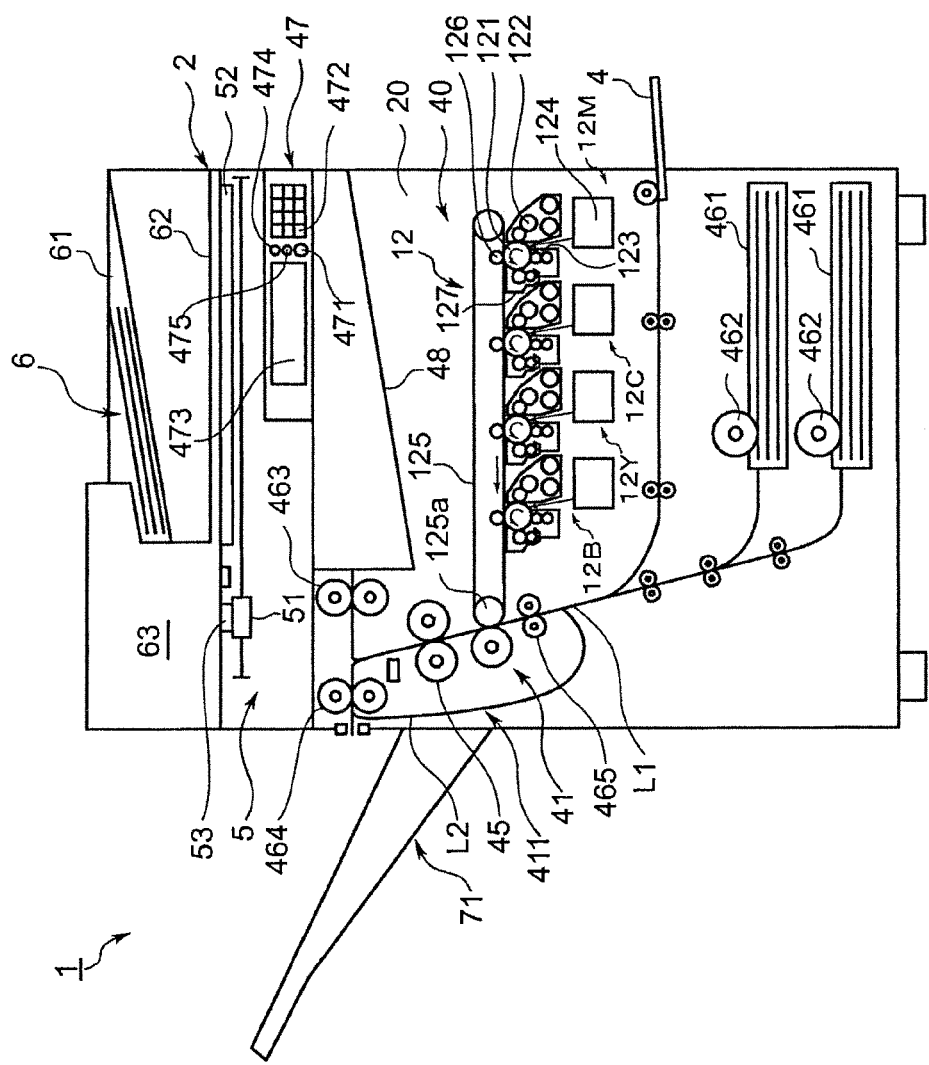
FIG. 1 is a cross-sectional view illustrating a mechanical configuration of an image forming apparatus including a document conveying device according to an embodiment of the present disclosure.

A document conveying device and an image forming apparatus according to an embodiment of the present disclosure will now be described with reference to the drawings. FIG. 1 is a cross-sectional view illustrating a mechanical configuration of an image forming apparatus including a document conveying device according to an embodiment of the present disclosure. An image forming apparatus 1 is, for example, a multifunction peripheral having a plurality of functions including a copier function, a printer function, a scanner function, and a facsimile function. The image forming apparatus 1 includes an apparatus main body 2, which includes a main body unit 20, a manual feed tray 4, a document reader 5 disposed in an upper part of the apparatus main body 2, and a document conveying mechanism 6 positioned above the document reader 5.

An operation unit 47 is located at the front of the image forming apparatus 1. The operation unit 47 includes a start key 471, a numeric keypad 472, a display 473, a reset key 474, and a stop key 475.

The display 473 is, for example, a liquid crystal display (LCD) that displays operation guide information for each of the above-described functions of the image forming apparatus 1. The display 473 has a touch panel function that allows the user to enter various settings for each of the functions described above.

The document reader 5 includes a scanner unit 51 composed of a charge-coupled device (CCD) sensor and an image illuminating lamp, a document table 52 formed by a transparent member such as a glass member, and a document reading slit 53. The scanner unit 51 is configured to be moved by a driving part (not shown). When reading a document placed on the document table 52, the scanner unit 51 is moved along the document surface, at a position facing the document table 52. While scanning the document surface, the scanner unit 51 acquires image data of the document. The scanning unit 51 then outputs the acquired image data to a controller 100 (described below). When reading a document fed by the document conveying mechanism 6, the scanner unit 51 is moved to face the document reading slit 53. In synchronization with the document conveying operation of the document conveying mechanism 6, the scanner unit 51 reads, through the document reading slit 53, the document fed by the conveying operation. Then, the scanner unit 51 outputs image data of the read document to the controller 100.

The document conveying mechanism 6 includes a document tray 61 on which documents are placed, a document discharge unit 62 to which a document whose image has been read is discharged, and a document conveying unit 63.

The document conveying unit 63 feeds documents one at a time from the document tray 61 to a position facing the document reading slit 53. Thus, the scanner unit 51 can read an image of each document at the position facing the document reading slit 53. Then, the document conveying unit 63 discharges the document to the document discharge unit 62. If the document conveying unit 63 causes a sheet reversing mechanism to turn the document upside down and feeds the document again to the position facing the document reading slit 53, the scanner unit 51 can read images on both sides of the document through the document reading slit 53.

The document conveying mechanism 6 is pivotally attached to the apparatus main body 2 such that the front side of the document conveying mechanism 6 can be raised. When the front side of the document conveying mechanism 6 is raised to open the upper surface of the document table 52, the user can place a document to be read, such as a book with pages open, on the upper surface of the document tray 61.

The apparatus main body 2 includes a plurality of paper feed cassettes 461 configured to hold recording sheets, a plurality of feeding rollers 462 each configured to feed recording sheets one by one from the corresponding paper feed cassette 461 to an image forming section 40, and the image forming section 40 configured to form an image on a recording sheet from one of the paper feed cassettes 461 and output the recording sheet having the image formed thereon.

The image forming section 40 includes an image forming mechanism 12 and a fixing unit 45. The image forming mechanism 12 performs an image forming operation that involves forming a toner image on a recording sheet fed from one of the paper feed cassettes 461 or the manual feed tray 4.

The image forming mechanism 12 includes an intermediate transfer belt 125; image forming units 12M, 12C, 12Y, and 12B for magenta, cyan, yellow, and black, respectively, disposed adjacent to the intermediate transfer belt 125; driving rollers 125a that allow the intermediate transfer belt 125 to run; and a secondary transfer roller 41.

The image forming units 12M, 12C, 12Y, and 12B each include a photosensitive drum 121, a developing device 122, a toner cartridge (not shown), a charging device 123, an exposure device 124, a primary transfer roller 126, and a drum cleaner 127.

During execution of a print job, the controller 100 drive-controls the image forming units 12M, 12C, 12Y, and 12B to transfer magenta, cyan, yellow, and black toner images, respectively, in an overlapping manner onto the surface of the intermediate transfer belt 125, so that a color toner image is formed on the surface of the intermediate transfer belt 125 (intermediate or primary transfer).

The color toner image formed on the surface of the intermediate transfer belt 125 is transferred by the secondary transfer roller 41 onto a recording sheet conveyed from a sheet conveying unit 411. The color toner image transferred onto the recording sheet is fixed by the fixing unit 45.

The sheet conveying unit 411 includes a sheet conveying path L1, a sheet backward-conveying path L2, and conveying rollers 463, 464, and 465. By driving the conveying rollers 463 and 464, the sheet conveying unit 411 feeds, to a stacking tray 71 or an output tray 48, the recording sheet onto which the toner image has been fixed.

For the image forming section 40 to form images on both sides of a recording sheet and output it, the sheet conveying unit 411 causes the recording sheet having an image formed on one side by the image forming section 40 to be nipped between the conveying rollers 463 adjacent to the output tray 48. Then, the sheet conveying unit 411 reverses the rotation of the conveying rollers 463 to feed the recording sheet to the sheet backward-conveying path L2 and, again, to the upstream region of the image forming section 40. Thus, an image is formed on the other side of the recording sheet by the image forming section 40.

Figure 2:
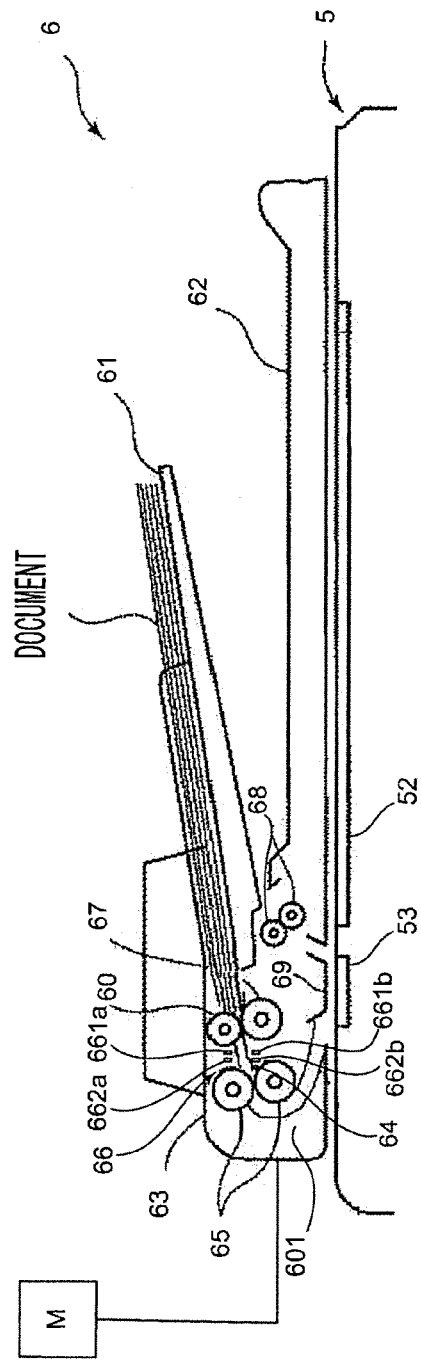
FIG. 2 is a schematic side view illustrating an internal configuration of a document conveying unit.

A configuration of the document conveying mechanism 6 will now be described. FIG. 2 is a schematic side view illustrating an internal configuration of the document conveying mechanism 6.

As described above, the document conveying mechanism 6 feeds a document to the document reading slit 53, which is a document reading area for the scanner unit 51. In addition to the document tray 61 and the document discharge unit 62, the document conveying mechanism 6 includes a driving unit M, a paper feed roller 60, a registration sensor 64, a registration roller pair 65, a document sensor assembly 66, a separation roller 67, a eject roller pair 68, a document retainer 69, and a document conveying path 601. The driving unit M, the paper feed roller 60, the registration sensor 64, the registration roller pair 65, the document sensor assembly 66, the separation roller 67, the eject roller pair 68, the document retainer 69, and the document conveying path 601 function as the document conveying unit 63.

The paper feed roller 60 and the separation roller 67 are arranged in a pair and are in contact with each other. The paper feed roller 60 and the separation roller 67 separate documents on the document tray 61 one at a time to feed each document to the registration roller pair 65 while holding the document in the nip between the rollers. The registration sensor 64 and the registration roller pair 65 are located upstream of the document reading slit 53 in the document feeding direction. The rotation axes of paper feed roller 60, the separation roller 67, the registration roller pair 65, and the eject roller pair 68 are orthogonal to the document feeding direction.

The registration roller pair (conveying roller pair) 65 is a pair of rollers that regulate the timing of feeding a document to the document reading slit 53. The leading edge of a document fed in the document feeding direction by the paper feed roller 60 and the separation roller 67 along the document conveying path 601 is brought into contact with the registration roller pair 65, over the entire rotation axes of the registration roller pair 65. If the document is fed along the document feeding path 601, with the leading edge thereof inclined with respect to the direction orthogonal to the document feeding direction, the forward portion of the leading edge in the document feeding direction is first brought into contact with the registration roller pair 65 and its travel is restricted. The other portion of the leading edge is subsequently brought into contact with the registration roller pair 65 and its travel is also restricted. Thus, the skew of the document fed along the document conveying path 601 is corrected, so that the leading edge of the document becomes orthogonal to the document feeding direction. Then, the registration roller pair 65 feeds the document toward the document reading slit 53 while holding the document in the nip between the rollers.

The registration sensor 64 detects the leading edge and the trailing edge of the document fed to the registration roller pair 65. The eject roller pair 68 ejects the document whose image has been read to the document discharge unit 62.

The document sensor assembly (document detector assembly) 66 detects the leading edge of the document fed along the document conveying path 601 in the document feeding direction. In the document conveying path 601, the document sensor assembly 66 is positioned, for example, between the position of the pair of the paper feed roller 60 and the separation roller 67 and the position of the registration roller pair 65.

The document retainer 69 is located so as to face a long narrow contact glass plate in the document reading slit 53, with a predetermined space therebetween. The document retainer 69 allows the document fed in the document conveying path 601 to pass close to the contact glass plate. Although the document retainer 69 having a plate-like shape is used in this embodiment, a platen roller may be used instead.

The document conveying mechanism 6 includes the driving unit M serving as a driving source that supplies a rotational driving force to the paper feed roller 60, the separation roller 67, the registration roller pair 65, and the eject roller pair 68.

The driving unit M is a stepping motor (or pulse motor) in this embodiment. The rotation (i.e., the rotation angle and speed) of the stepping motor, which serves as the driving unit M, is drive-controlled in accordance with the number of pulses and frequency of a pulse signal, so that the stepping motor operates in synchronization with the pulse signal. That is, each time a pulse signal is received, the stepping motor rotates by a predetermined angle. The controller 100 outputs, to a driver of the driving unit M, a required number of pulse signals for drive-controlling the stepping motor, so as to cause the stepping motor to operate in synchronization with the pulse signals.

In the document conveying mechanism 6, for feeding documents from the document tray 61, the driving unit M starts to drive under drive-control of the controller 100, so that a rotational driving force supplied from the driving unit M rotates the paper feed roller 60, the separation roller 67, the registration roller pair 65, and the eject roller pair 68. The paper feed roller 60 and the separation roller 67 feed one of documents from the document tray 61 and feeds it into the document conveying path 601. Upon receipt of the document, the registration roller pair 65 feeds it toward the document reading slit 53 under control of the controller 100, using a timing based on a document detection signal from the registration sensor 64. At the position of the document reading slit 53, the scanner unit 51 reads an image on the surface of the fed document, over the range from the leading edge to the trailing edge of the document in the document feeding direction. The document passed through the document reading slit 53 is received by the eject roller pair 68 and ejected to the document discharge unit 62 by the eject roller pair 68.

Figure 3:
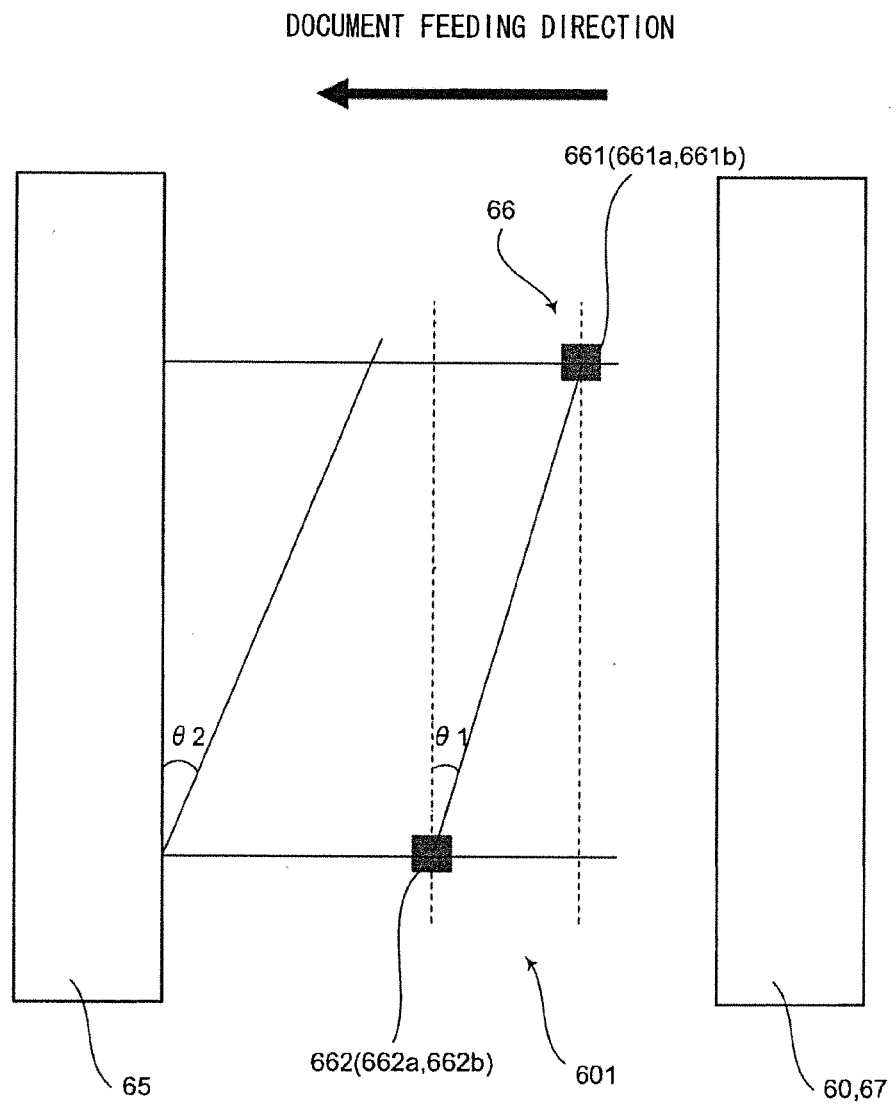
FIG. 3 is a plan view illustrating a position of a document sensor assembly in a document conveying path.

A configuration of the document sensor assembly 66 will now be described. FIG. 3 is a plan view illustrating the position of the document sensor assembly 66 in the document conveying path 601. The following description will be given with reference also to FIG. 2.

The document sensor assembly 66 includes a first document sensor (first document detector) 661 and a second document sensor (second document detector) 662 which are, for example, feed sensors. In the document conveying path 601, the first document sensor 661 and the second document sensor 662 are located, for example, between the position of the pair of the paper feed roller 60 and the separation roller 67 and the position of the registration roller pair 65.

The first document sensor 661 includes a light-projecting unit 661*a* and a light-receiving unit 661*b*. The light-projecting unit 661*a* includes a light-emitting diode (LED) to emit light, and the light-receiving unit 661*b* includes a photodiode to receive light emitted by the light-projecting unit 661*a*. The light-projecting unit 661*a* and the light-receiving unit 661*b* are located on guide plates above and below the document conveying path 601, respectively. Similarly, the second document sensor 662 includes a light-projecting unit 662*a* and a light-receiving unit 662*b*. Since the first document sensor 661 and the second document sensor 662 have the same configuration, only the first document sensor 661 will be described as an example here.

For example, the light-projecting unit 661*a* is located on the guide plate above a recording sheet fed along the document conveying path 601, and the light-receiving unit 661*b* is located on the guide plate below the recording sheet fed along the document conveying path 601. The light-projecting unit 661*a* and the light-receiving unit 661*b* are positioned to face each other across the document conveying path 601. When no recording sheet passes through the position in the document conveying path 601 where the light-projecting unit 661*a* and the light-receiving unit 661*b* face each other, light emitted by the light-projecting unit 661*a* is received by the light-receiving unit 661*b*. Upon receipt of the light, the light-receiving unit 661*b* outputs, for example, an ON signal to a control section 10 (described below). On the other hand, when a recording sheet passes through the position in the document conveying path 601 where the light-projecting unit 661*a* and the light-receiving unit 661*b* face each other, light emitted by the light-projecting unit 661*a* is blocked by the recording sheet and is not received by the light-receiving unit 661*b*. When the emitted light is not received, the light-receiving unit 661*b* outputs an OFF signal to the control section 10. That is, the light-receiving unit 661*b* outputs an OFF signal when the leading edge of a document fed along the document conveying path 601 reaches the position where the light-projecting unit 661*a* and the light-receiving unit 661*b* face each other. This means that the light-receiving unit 661*b* detects the leading edge of the document at this position.

As illustrated in FIG. 3, the first document sensor 661 and the second document sensor 662 are located at different positions of the document conveying path 601 in the direction orthogonal to the document feeding direction.

At the same time, the first document sensor 661 and the second document sensor 662 are located at different positions in the document feeding direction. In this embodiment, in the document conveying path 601, the first document sensor 661 is located upstream of the second document sensor 662 in the document feeding direction.

The first document sensor 661 and the second document sensor 662 positioned as described above are configured to detect the leading edge of a document in the document conveying direction at their respective positions.

In FIG. 3, reference symbol θ1 denotes the amount of inclination of a straight line connecting the first document sensor 661 and the second document sensor 662 with respect to the direction orthogonal to the document feeding direction; and reference symbol θ2 denotes the amount of inclination of the leading edge of a document with respect to the direction orthogonal to the document feeding direction, the inclination being a correctable inclination that can be corrected by bringing the leading edge of the document into contact with the registration roller pair 65. A positional relationship between the first document sensor 661 and the second document sensor 662 on the document conveying path 601 is determined such that the amount of inclination θ1 does not exceed the amount of inclination θ2.

Figure 4:
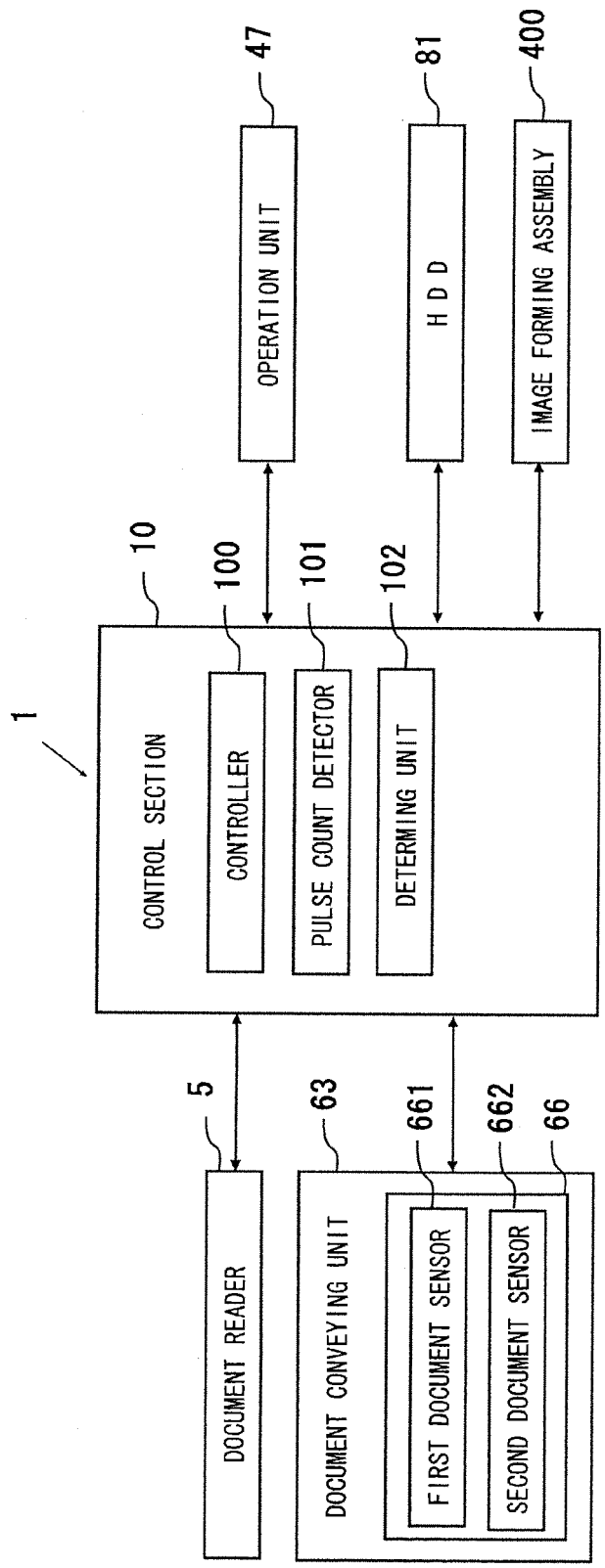
FIG. 4 is a block diagram illustrating an electric configuration of the image forming apparatus.
Figure 5B:
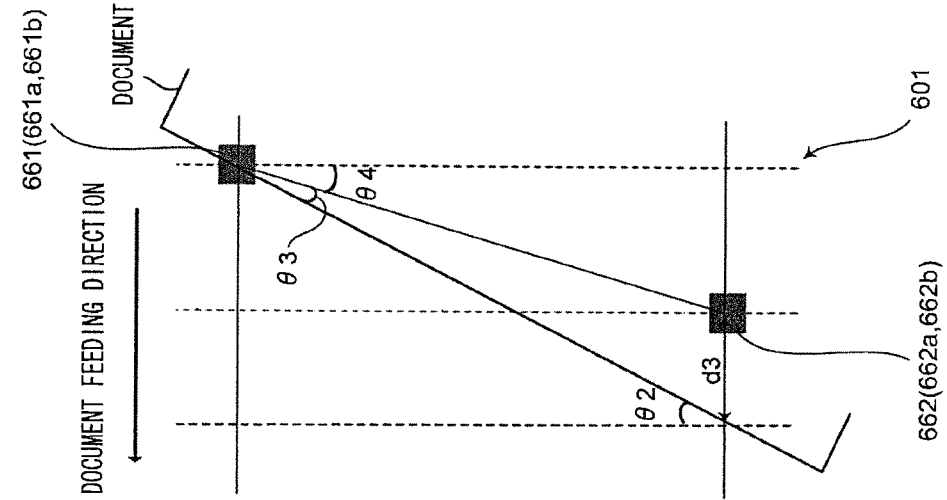
FIG. 5B also illustrates the relationship between an inclination of a document and the positions of the first and second document sensors.
Figure 5A:
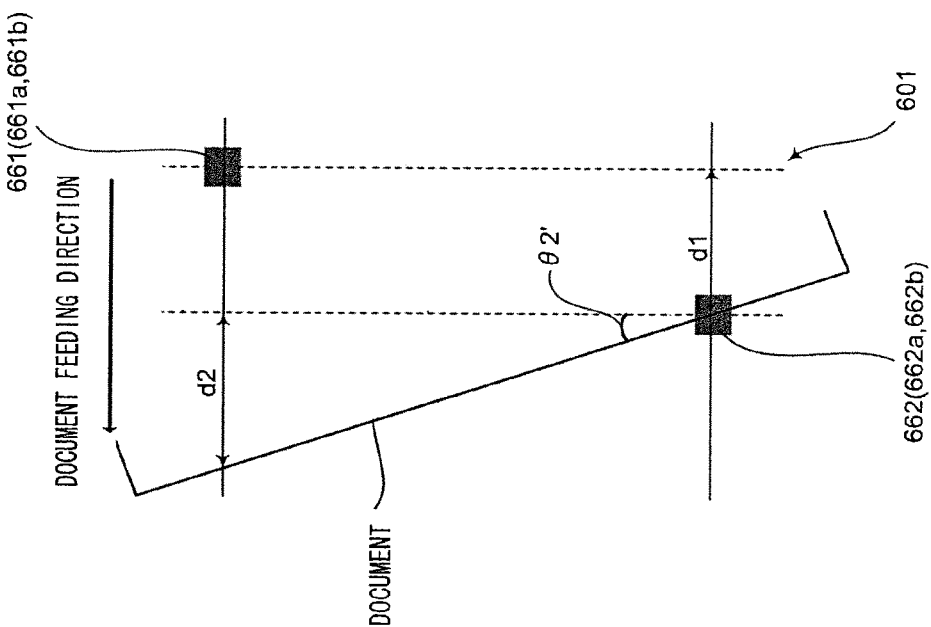
FIG. 5A illustrates the relationship between an inclination of a document and the positions of first and second document sensors.

FIG. 4 is a block diagram illustrating an electric configuration of the image forming apparatus 1. FIG. 5A and FIG. 5B each illustrate the relationship between an inclination of a document and the positions of the first document sensor 661 and the second document sensor 662. Note in FIG. 4 that the sheet conveying unit 411 and the image forming section 40 are collectively illustrated as an image forming assembly 400, which is an example of an image forming assembly.

The document reader 5, the document conveying unit 63, the operation unit 47, the image forming assembly 400, and a hard disk drive (HDD) 81 are connected to the control section 10. The control section 10 includes the controller 100, which controls the document reader 5, the document conveying unit 63, the operation unit 47, the image forming assembly 400, and the HDD 81.

As described above, the document conveying unit 63 includes the document sensor assembly 66. The first document sensor 661 and the second document sensor 662 of the document sensor assembly 66 are drive-controlled by the controller 100. The first document sensor 661 and the second document sensor 662 output, to a pulse count detector 101 of the control section 10, ON and OFF signals indicating whether the leading edge of the document has been detected.

The control section 10 includes a central processing unit (CPU), a random-access memory (RAM), a read-only memory (ROM), and dedicated hardware circuits. The control section 10 controls an overall operation of the image forming apparatus 1.

The control section 10 includes the controller 100, the pulse count detector 101, and a determining unit 102. The control section 10 includes the CPU and the memories described above. The CPU in the control section 10 operates in accordance with operation control programs stored in the memories to function as the controller 100, the pulse count detector 101, and the determining unit 102. Alternatively, the control section 10 may include dedicated hardware circuits corresponding to the controller 100, the pulse count detector 101, and the determining unit 102 to function as these components.

The controller 100 controls the overall operation of the image forming apparatus 1. For example, the controller 100 controls the operation of each of the document conveying unit 63, the document reader 5, and the image forming assembly 400 to form an image read from a document surface onto a recording sheet. The controller 100 drive-controls the driving unit M (motor, such as a stepping motor), which serves as a driving source of the document conveying unit 63, by varying a driving pulse. Thus, the controller 100 controls a document conveying operation performed by the document conveying unit 63.

The pulse count detector 101 receives ON and OFF signals from the first document sensor 661 and the second document sensor 662. On the basis of the ON and OFF signals received, the pulse count detector 101 detects the number of pulses (driving pulses) of a pulse signal that the controller 100 uses to drive-control the document conveying unit 63 (driving unit M), during the period from the detection of a document leading edge by the first document sensor 661 to the detection of the document leading edge by the second document sensor 662.

The determining unit 102 determines whether the number of pulses detected by the pulse count detector 101 during the period described above exceeds a predetermined value. If the determining unit 102 determines that the number of pulses exceeds the predetermined value, the controller 100 stops the document feeding operation of the document conveying unit 63.

If detection of the document leading edge by the first document sensor 661 precedes the detection of the document leading edge by the second document sensor 662 (see FIG. 5A), the determining unit 102 uses a first value Pa as the predetermined value. The first value Pa may be given by Pa=p1+p2, where p1 is the number of pulses of a pulse signal for causing the controller 100 to drive-control the document conveying unit 63 to move the document by a distance d1 between the first document sensor 661 and the second document sensor 662 in the document feeding direction; and p2 is the number of pulses for moving the document by a distance d2 in the document feeding direction, the distance d2 corresponding to an angle of inclination θ2' of the leading edge of the document with respect to the direction orthogonal to the document feeding direction, when a portion of the leading edge of the document adjacent to the second document sensor 662 is fed behind a portion of the leading edge of the document adjacent to the first document sensor 661 and the leading edge of the document is inclined by the amount of inclination θ2' that can be corrected by bringing the leading edge of the document into contact with the registration roller pair 65.

If detection of the document leading edge by the second document sensor 662 precedes the detection of the document leading edge by the first document sensor 661 (see FIG. 5B), the determining unit 102 uses a second value Pb as the predetermined value. The second value Pb is the number of driving pulses for causing the controller 100 to drive-control the document conveying unit 63 to move the document by a distance d3 in the document feeding direction, the distance d3 corresponding to an angle of inclination θ3 of the leading edge of the document with respect to a straight line connecting the first document sensor 661 and the second document sensor 662 (or a straight line inclined by the amount of inclination θ4 with respect to the direction orthogonal to the document feeding direction), when a portion of the leading edge adjacent to the first document sensor 661 is fed behind a portion of the leading edge adjacent to the second document sensor 662 and the leading edge is inclined by the amount of inclination θ2 that can be corrected by bringing the leading edge of the document into contact with the registration roller pair 65.

The operation unit 47 accepts input of an operation instruction for the image forming apparatus 1 from the operator. In accordance with various operation instructions input to the operation unit 47, the controller 100 controls an image forming operation of the image forming apparatus 1 and an operation of the document conveying unit 63.

A document conveying device according to an embodiment of the present disclosure includes the document conveying unit 63, the controller 100, the pulse count detector 101, the determining unit 102, and the operation unit 47. The operation unit 47 may be removed from the document conveying device if not necessary in the following embodiments.

The angles θ1, θ2, θ2', θ3, and θ4 described above are measured and set, for example, by the manufacturer before shipment from the factory for manufacturing the image forming apparatus 1 and the document conveying device. The angles θ2 and θ2' may be set to either the same or different values depending on the result of the measurement.

Figure 6:
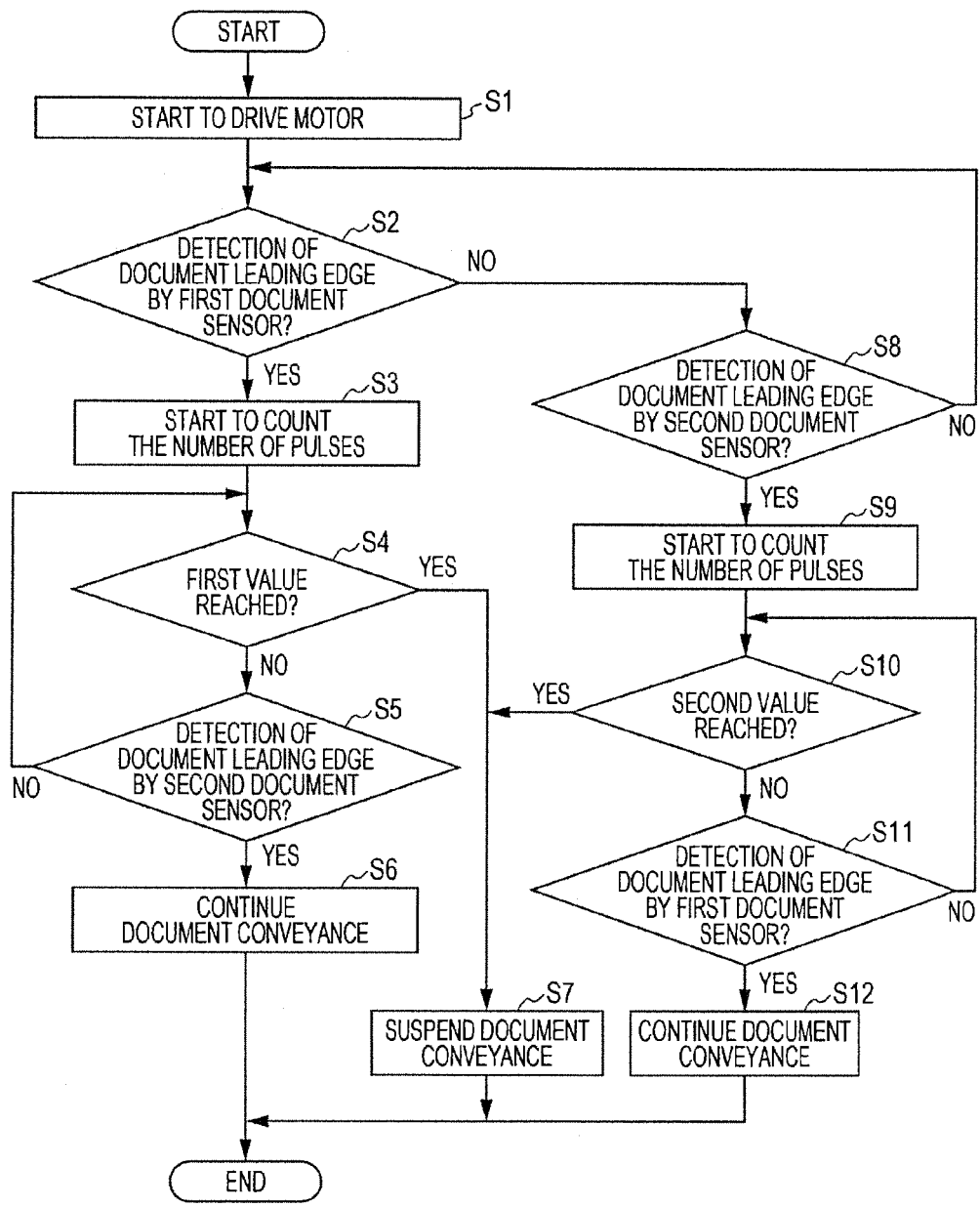
FIG. 6 is a flowchart illustrating a process performed when the document conveying unit is drive-controlled in the image forming apparatus.

Drive control of the document conveying unit 63 in the image forming apparatus 1 will now be described. FIG. 6 is a flowchart illustrating a process performed when the document conveying unit 63 is drive-controlled in the image forming apparatus 1.

If an instruction to start, for example, a copying operation, a scanning operation, or a faxing operation is input by the operator from the operation unit 47, the controller 100 starts to drive the driving unit M of the document conveying unit 63 (step S1).

Thus, a rotational driving force supplied from the driving unit M rotates the paper feed roller 60, the separation roller 67, the registration roller pair 65, and the eject roller pair 68, and the document conveying unit 63 starts to feed an document from the document tray 61. The paper feed roller 60 and the separation roller 67 feed one of sheets from the document tray 61 and into the document conveying path 601. The controller 100 causes the first document sensor 661 or the second document sensor 662 to start document detection.

The document fed from the document tray 61 by the paper feed roller 60 and the separation roller 67 is fed along the document conveying path 601 toward the registration roller pair 65. The leading edge of the document does not pass through either the first document sensor 661 or the second document sensor 662 immediately after the start of conveyance. Therefore, from the first document sensor 661 or the second document sensor 662, the pulse count detector 101 receives an ON signal indicating that the leading edge of the document has not been detected.

Then, if the pulse count detector 101 receives, first from the first document sensor 661, an OFF signal indicating that the leading edge of the document has been detected (YES in step S2), the pulse count detector 101 starts to count the number of pulse signals upon receipt of the OFF signal (step S3).

The determining unit 102 determines whether the pulse count detector 101 has received an OFF signal from the second document sensor 662 before the number of pulse signals counted by the pulse count detector 101 reaches the first value Pa, the OFF signal indicating that the leading edge of the document has been detected. If the determining unit 102 determines that the pulse count detector 101 has received the OFF signal before the number of pulse signals counted by the pulse count detector 101 reaches the first value Pa (NO in step S4 and YES in step S5), the controller 100 allows the document conveying unit 63 to continue the document conveying operation (step S6). Note that since the pulse count detector 101 has received the OFF signal from the first document sensor 661 before receiving the OFF signal from the second document sensor 662, the determining unit 102 makes the above-described determination using the first value Pa.

If the determining unit 102 determines that the pulse count detector 101 has received an ON signal from the second document sensor 662, the ON signal indicating that the leading edge of the document has not been detected, and that the pulse count detector 101 has not received the OFF signal from the second document sensor 662 even when the number of pulse signals counted by the pulse count detector 101 reaches the first value Pa (NO in step S5 and YES in step S4), the controller 100 stops driving the driving unit M to suspend the document feeding operation of the document conveying unit 63 (step S7).

After the controller 100 starts to drive the driving unit M (after step S1), if the pulse count detector 101 receives the OFF signal from the second document sensor 662 before receiving the OFF signal from the first document sensor 661 (NO in step S2 and YES in step S8), the pulse count detector 101 starts to count the number of pulse signals (step S9). Note that since the pulse count detector 101 has received the OFF signal from the second document sensor 662 before receiving the OFF signal from the first document sensor 661, the determining unit 102 makes the above-described determination using the second value Pb.

If the determining unit 102 determines that the pulse count detector 101 has received the OFF signal from the first document sensor 661 before the number of pulse signals counted by the pulse count detector 101 reaches the second value Pb (NO in step S10 and YES in step S11), the controller 100 allows the document conveying unit 63 to continue the document conveying operation (step S12). Note that since the pulse count detector 101 has received the OFF signal from the second document sensor 662 before receiving the OFF signal from the first document sensor 661, the determining unit 102 makes the above-described determination using the second value Pb.

If the determining unit 102 determines that the pulse count detector 101 has received the ON signal from the first document sensor 661 and has not received the OFF signal from the first document sensor 661 even when the number of pulse signals counted by the pulse count detector 101 reaches the second value Pb (NO in step S11 and YES in step S10), the controller 100 stops driving the driving unit M to suspend the document feeding operation of the document conveying unit 63 (step S7).

In the document conveying mechanism 6, because the two document sensors do not need to be arranged in a line orthogonal to the document feeding direction, accuracy is not required in positioning each document sensor. In a document conveying device of the prior art where two document sensors must be arranged in a line orthogonal to the document feeding direction, any misalignment of the two document sensors in the document feeding direction may lead to an error in the detected amount of inclination of the document, because it is difficult to ensure accuracy in the number of pulses counted until the detection of the leading edge of the document by each document sensor. In the document conveying mechanism 6, where a positional difference between the first document sensor 661 and the second document sensor 662 in the document feeding direction does not cause any problem, it is possible to accurately count the number of pulses used in document feeding control and accurately detect the inclination of the document.

In the document conveying mechanism 6 and the image forming apparatus 1, accuracy is not required in positioning the first document sensor 661 and the second document sensor 662. Even with a positional difference between the first document sensor 661 and the second document sensor 662 in the document conveying direction, it is still possible to accurately detect an inclination of a document and appropriately perform document feeding control in accordance with the inclination of the document.

In the document conveying mechanism 6, the amount of inclination of a straight line connecting the first document sensor 661 and the second document sensor 662 with respect to the direction orthogonal to the document feeding direction does not exceed the amount of document inclination that can be corrected by bringing the leading edge of the document into contact with the registration roller pair 65. Therefore, in the document conveying mechanism 6, as long as the amount of inclination of the straight line connecting the first document sensor 661 and the second document sensor 662 with respect to the direction orthogonal to the document feeding direction does not exceed the amount of document inclination that can be corrected, the first document sensor 661 and the second document sensor 662 can be arranged at any positions without restriction.

If an OFF signal indicating that a document leading edge has been detected is received first from the first document sensor 661, the determining unit 102 uses, as the first value (predetermined value), the number of pulses determined by taking into account a delay of a portion of the document leading edge adjacent to the second document sensor 662 fed behind a portion of the document leading edge adjacent to the first document sensor 661. Therefore, although the document conveying mechanism 6 includes the first document sensor 661 and the second document sensor 662 that can be arranged without much restriction, it is possible to accurately detect the inclination of the document in which a portion of its leading edge adjacent to the second document sensor 662 is fed behind.

If an OFF signal indicating that a document leading edge has been detected is received from the second document sensor 662 earlier than that from the first document sensor 661, the determining unit 102 uses, as the second value (predetermined value), the number of pulses determined by taking into account an acceptable delay in detection of the document leading edge by the first document sensor 661 when a portion of the document leading edge adjacent to the first document sensor 661 is fed behind a portion of the document leading edge adjacent to the second document sensor 662. Therefore, although the document conveying mechanism 6 includes the first document sensor 661 and the second document sensor 662 that can be arranged without much restriction, it is possible to accurately detect the inclination of the document in which a portion of its leading edge adjacent to the first document sensor 661 is fed behind.

The present disclosure is not limited to the configurations of the embodiments described above, and various modifications can be made thereto. For example, although the first and second values have been described as examples of the predetermined value used by the determining unit 102, the first and second values may be variable. For example, the operation unit (accepting unit) 47 may accept input of any value from the operator as the predetermined value, so that the determining unit 102 uses the value input to the operation unit 47 as the predetermined value.

In this case, the operator inputs, to the operation unit 47, an appropriate value corresponding to an error in document feeding control caused by variation in position of the first document sensor 661 and the second document sensor 662 among document conveying mechanisms 6 of various devices. Then, by using the input value as the predetermined value, the controller 100 can perform document feeding control. Therefore, even if the position of each sensor varies from one device to another, document feeding control can be performed accurately in accordance with the inclination of the document.

In the embodiments described above, the first document sensor 661 and the second document sensor 662 are located on the upper side and the lower side, respectively, in FIG. 3 and FIGS. 5A and 5B. However, in the document conveying mechanism 6, the positions of the first document sensor 661 and the second document sensor 662 in FIG. 3 and FIGS. 5A and 5B may be reversed.

In the embodiments described above, both the first document sensor 661 and the second document sensor 662 are optical sensors, each having a light-projecting unit (661a or 662a) and a light-receiving unit (661b or 662b). However, one or both of the first document sensor 661 and the second document sensor 662 may be a switch or switches that is or are mechanically configured to be turned on by being pressed by a document leading edge when the document leading edge passes through the switch or switches.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A document conveying device comprising:
a document conveying unit configured to feed a document;
a controller configured to control a document feeding operation performed by the document conveying unit;
a first document detector located on a feeding path along which a document is fed by the document conveying unit, the first document detector configured to detect a leading edge of the document;
a second document detector located at a position which is a first distance d1 downstream from the first document detector in the document feeding direction and different from that of the first document detector in a direction orthogonal to the document feeding direction, the document feeding direction being a direction in which the document conveying unit feeds the document, the second document detector configured to detect the leading edge of the document;
a pulse count detector configured to detect the number of pulses of a pulse signal that the controller uses to drive-control the document conveying unit;
a determining unit configured to determine whether the number of pulses detected by the pulse count detector during the period from the detection of a document leading edge by one of the first and second document detectors to the detection of the document leading edge by the other of the first and second document detectors exceeds a predetermined value; and
the predetermined value includes a first value and a second value,
the first value is the sum of the number of the first pulses p1 for causing the controller to drive-control the document conveying unit to move the document by the first distance d1 in the document feeding direction and the number of the second pulses p2 for moving the document by the second distance d2 which is greater than or equal to the first distance d1 in the document feeding direction, and the second value is a value given by subtracting the number of first pulses p1 from the number of the second pulses p2, wherein when the determining unit determines that the detection of the document leading edge by the first document detector precedes the detection of the document leading edge by the second document detector, the determining unit uses the first value as the predetermined value to determine whether the number of pulses exceeds the predetermined value, when the determining unit determines that the detection of the document leading edge by the second document detector precedes the detection of the document leading edge by the first document detector, the determining unit uses the second value as the predetermined value to determine whether the number of pulses exceeds the predetermined value, when the determining unit determines that the number of pulses exceeds the predetermined value, the controller stops the document feeding operation.

2. The document conveying device according to claim 1, comprising a conveying roller pair having rotation axes extending in the direction orthogonal to the document feeding direction, the conveying roller pair being a pair of conveying rollers with which a leading edge of a document that has passed through the first and second document detectors is brought into contact by the document conveying unit, the conveying roller pair configured to feed the document whose leading edge has been brought into contact therewith while holding the document in the nip between the conveying rollers.

3. The document conveying device according to claim 2, wherein the conveying roller pair is a registration roller pair configured to regulate the timing of feeding a document.

4. The document conveying device according to claim 1, comprising:
a stepping motor configured to drive the document conveying unit; and
the pulse count detector detects the number of pulses of a pulse signal for driving the stepping motor.

5. The document conveying device according to claim 1, comprising:
an accepting unit configured to accept input of any value from an operator as the predetermined value; and
the determining unit uses, as the predetermined value, a value whose input has been accepted by the accepting unit.

6. An image forming apparatus comprising:
a document conveying unit configured to feed a document;
a controller configured to control a document conveying operation performed by the document conveying unit;
a first document detector located on a conveying path along which a document is fed by the document conveying unit, the first document detector configured to detect a leading edge of the document;
a second document detector located at a position which is a first distance d1 downstream from the first document detector in the document feeding direction and different from that of the first document detector in a direction orthogonal to the document feeding direction, the document feeding direction being a direction in which the document conveying unit feeds the document, the second document detector configured to detect the leading edge of the document;
a pulse count detector configured to detect the number of pulses of a pulse signal that the controller uses to drive-control the document conveying unit;

a determining unit configured to determine whether the number of pulses detected by the pulse count detector during the period from the detection of a document leading edge by one of the first and second document detectors to the detection of the document leading edge by the other of the first and second document detectors exceeds a predetermined value;

a document reader configured to read an image of a document fed by the document conveying unit;

an image forming assembly configured to perform image formation based on the document image read by the document reader; and the predetermined value includes a first value and a second value, the first value is the sum of the number of the first pulses p1 for causing the controller to drive-control the document conveying unit to move the document by the first distance d1 in the document feeding direction and the number of the second pulses p2 for moving the document by the second distance d2 which is greater than or equal to the first distance d1 in the document feeding direction, and the second value is a value given by subtracting the number of first pulses p1 from the number of the second pulses p2, wherein when the determining unit determines that the detection of the document leading edge by the first document detector precedes the detection of the document leading edge by the second document detector, the determining unit uses the first value as the predetermined value to determine whether the number of pulses exceeds the predetermined value, when the determining unit determines that the detection of the document leading edge by the second document detector precedes the detection of the document leading edge by the first document detector, the determining unit uses the second value as the predetermined value to determine whether the number of pulses exceeds the predetermined value, when the determining unit determines that the number of pulses exceeds the predetermined value, the controller stops the document feeding operation.

7. The image forming apparatus according to claim 4, further comprising an accepting unit configured to accept input of any value from an operator as the predetermined value, wherein the determining unit uses, as the predetermined value, a value whose input has been accepted by the accepting unit.

8. The image forming apparatus according to claim 4, comprising a stepping motor configured to drive the document conveying unit; and
the pulse count detector detects the number of pulses of a pulse signal for driving the stepping motor.

9. The image forming apparatus according to claim 6, comprising a conveying roller pair having rotation axes extending in the direction orthogonal to the document feeding direction, the conveying roller pair being a pair of conveying rollers with which a leading edge of a document that has passed through the first and second document detectors is brought into contact by the document conveying unit, the conveying roller pair configured to feed the document whose leading edge has been brought into contact therewith while holding the document in the nip between the conveying rollers.

10. The image forming apparatus according to claim 9, wherein the conveying roller pair is a registration roller pair configured to regulate the timing of feeding a document.

\* \* \* \* \*